United States Patent
Midavaine

(10) Patent No.: US 9,137,007 B2
(45) Date of Patent: Sep. 15, 2015

(54) METHOD OF SYNCHRONIZING OPTRONIC SYSTEMS AND SET OF OPTRONIC SYSTEMS SYNCHRONIZED ACCORDING TO THIS METHOD

(75) Inventor: Thierry Midavaine, Elancourt (FR)

(73) Assignee: THALES, Neuilly sur Seine (FR)

( * ) Notice: Subject to any disclaimer, the term of this patent is extended or adjusted under 35 U.S.C. 154(b) by 155 days.

(21) Appl. No.: 13/976,738

(22) PCT Filed: Dec. 23, 2011

(86) PCT No.: PCT/EP2011/073996
§ 371 (c)(1),
(2), (4) Date: Sep. 11, 2013

(87) PCT Pub. No.: WO2012/089682
PCT Pub. Date: Jul. 5, 2012

(65) Prior Publication Data
US 2014/0010554 A1    Jan. 9, 2014

(30) Foreign Application Priority Data
Dec. 27, 2010   (FR) ...................................... 10 05124

(51) Int. Cl.
*H04J 3/06* (2006.01)
*H04L 7/00* (2006.01)
*G01S 5/16* (2006.01)
*G01S 7/497* (2006.01)

(52) U.S. Cl.
CPC ................ *H04L 7/0075* (2013.01); *G01S 5/16* (2013.01); *G01S 7/497* (2013.01); *H04J 3/0644* (2013.01)

(58) Field of Classification Search
CPC ....... H04L 7/0075; H04J 3/0644; G01S 7/497

USPC .......................................................... 370/503
See application file for complete search history.

(56) References Cited

U.S. PATENT DOCUMENTS

| | | | |
|---|---|---|---|
| 4,622,458 A * | 11/1986 | Boeck et al. ................... | 342/451 |
| 8,351,483 B1 * | 1/2013 | Tucker ........................... | 375/130 |
| 2002/0073228 A1 * | 6/2002 | Cognet et al. .................. | 709/236 |
| 2006/0256820 A1 | 11/2006 | Ilnicki et al. | |
| 2008/0287153 A1 | 11/2008 | Fullam | |
| 2012/0002960 A1 | 1/2012 | Laitinen et al. | |

FOREIGN PATENT DOCUMENTS

GB        2426164 A      11/2006
WO    2010/084245 A1    7/2010

OTHER PUBLICATIONS

International Search Report and Written Opinion (and translations), dated Feb. 6, 2012, which issued during the prosecution of International Patent Application No. PCT/EP2011/073996, of which the present application is the national phase.

* cited by examiner

Primary Examiner — Sai-Ming Chan
(74) Attorney, Agent, or Firm — Troutman Sanders LLP

(57) ABSTRACT

A method of synchronizing optronic systems, of the type operating simultaneously on one and the same scene, each optronic system being intended to emit and/or receive light of a target of the scene and each optronic system having an internal precision clock and a module suitable for synchronizing the internal clock with a reference time signal, the method being characterized in that it has the following steps of receiving and generating a reference time signal by each synchronization module, the reference time signal being independent of the optronic systems and emanating from an item of equipment different from the optronic systems, and synchronizing the internal clock of each optronic system with the reference time signal by the synchronization module.

10 Claims, 5 Drawing Sheets

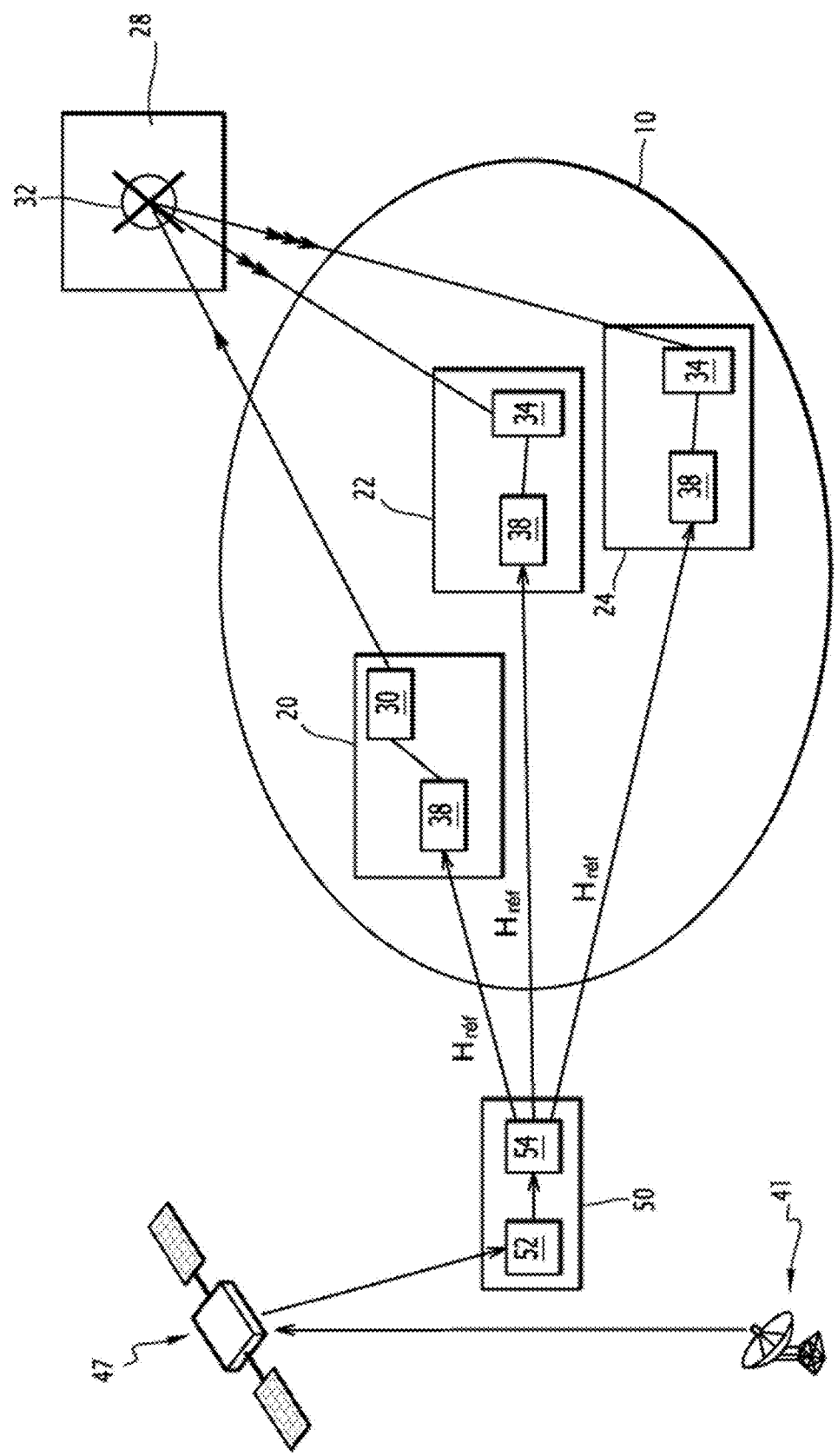

METHOD OF SYNCHRONIZING OPTRONIC SYSTEMS AND SET OF OPTRONIC SYSTEMS SYNCHRONIZED ACCORDING TO THIS METHOD

CROSS-REFERENCE TO RELATED APPLICATIONS

This application is the National Stage of International Application PCT/EP2011/073996 (the "PCT") filed Dec. 23, 2011. The PCT claims priority to French Application No. 10 05 124 filed Dec. 27, 2010. The PCT also published as WO/2012/089682 on Jul. 5, 2012. All of the foregoing applications are herein incorporated by reference.

FIELD OF THE INVENTION

The invention relates to a method of synchronizing optronic (optoelectronic) systems, of the type operating simultaneously on one and the same scene, each optronic system being intended to emit and/or receive light from a target of the scene and each optronic system comprising an internal precision clock and a module suitable for synchronizing the internal clock with a reference time signal. Further, it relates to a set of optronic systems synchronized in accordance with the above method. Furthermore, the invention relates to weapons systems and observation or monitoring and surveillance systems.

BACKGROUND

Certain optronic systems emit electromagnetic pulse trains in the direction of a target of the scene in order to designate or identify it. These electromagnetic pulses are preferably light pulses, for example emitted from flash lamps or lasers.

Others optronic systems perform the function of acquiring images or sequences of images of the scene with variable exposure times. Certain systems conduct scans of a line of sight in the scene or trigger shuttering devices. Others perform measurements for location of the target or measurements of angular separation (angular distances) and positions between the direction of a target on the scene (such as a tank, an airplane) and the direction of a vehicle or device (such as a missile) for example, or by measurements of orientation of the line of sight and distance between the target and the optronic system.

Certain components of these optronic systems are thus controlled by a law of temporal behaviour requiring precise specifications, for example, of the order of the nanosecond for laser pulses and up to the millisecond for cameras.

The difficulty is in synchronizing all of these operations without exposing the optronic systems operating on the scene.

In particular, in order to improve their mode of operation, their scope or their accuracy, it is useful to ensure that these independent optronic systems operate in a synchronous fashion.

This is the case for example of optronic semi-active laser systems having on the one hand, a laser transmission system operating at a certain rate, and on the other hand, data acquisition systems such as a distance gauging or imaging system looking to acquire the image of the laser illumination spot designating or identifying the target in the scene.

Another example is the case of independent mobile cameras seeking to be synchronized so as to improve for example the 3D rendering of a same given scene comprising of mobile units, for example, objects or targets that are moving in the scene, these camera also being capable of being mounted on independent platforms that are themselves mobile.

This is also the case for an imager that it is desirable to protect from a friendly pulsed laser jammer by carrying out a check of the exposure time for acquisition of images between the emission of successive pulses emitted by the jammer.

It is known that the synchronization of these operations is performed by outputting a signal via a wired connection or a microwave radio link for synchronization of one of the optronic systems with the other optronic systems to be synchronized if possible. However, the wired solution requires collocation of the optronic systems that are to be operating together and distributing the synchronization signal to each other.

In fact, if the optronic systems are not collocated, they must transmit to each other by microwave radio beam the synchronization signals. In this case, a synchronization tolerance is necessary, taking into account the transmission delay of the radio link. For example, for a distance of 300 m, there is a delay of 1 µs in view of the propagation at the speed of light. In order to reduce this tolerance, it is necessary to use a method for determining this transmission delay so as to compensate for it.

Another possibility is to incorporate a sensor in the optronic systems to be synchronized, that is capable of acquiring an optical signal, for example a laser pulse train emitted by one of the optronic systems in order to carry out the synchronization over at least one of the laser pulses. However, this requires the transmission of an optical signal by one of the optronic systems that may be detectable by enemy optronic systems.

Moreover, optronic systems designed to detect laser illumination pulses must have a long period of continuous exposure so as to perform the detection with the disadvantage of reducing the contrast between the spot of the laser pulse and the scene and thus the scope of the optronic systems.

Thus, it is not possible to synchronize passive independent equipment systems without transmitting, between the various optronic systems operating on one and the same scene, a microwave radio signal emitted by one of the optronic systems, or to synchronize active or semi-active independent equipment systems from the first laser pulse emitted by one of the optronic systems.

SUMMARY

The aim of the invention is to provide a method and a device for the synchronization of multiple optronic systems operating on one and the same scene without the transmission of a signal from one of the optronic systems that may be detectable by an enemy.

To this end, the invention relates to a method of synchronization of the aforementioned type, characterized in that it includes the following steps of receiving and generating a reference time signal by each synchronization module, the reference time signal being independent of the optronic systems and emanating from an item of equipment different from the optronic systems, and synchronizing the internal clock of each optronic system with the reference time signal by the synchronization module.

According to particular examples, the synchronization method comprises of one or more of the following characteristic features of adding a same given phase shift to the internal time signal of each optronic system of the same given fleet, the optronic systems being synchronized in phase, the phase shift is generated in a pseudo random manner, the reference time signal is a signal that is representative of the International Atomic Time or the Coordinated Universal Time broadcast by a communication network, the communication network is a GPS system or a microwave radio system. The method has for each optronic system a step of compensating for a phase shift induced by the propagation time of light between the illuminated target and the optronic system operating on the scene, and also compensating for a phase shift induced by the propagation time of the reference time signal between the transmitter of the reference time signal and the optronic system operating on the scene.

The invention also relates to a set of synchronized optronic systems of the type operating simultaneously on one and the same scene in a synchronous fashion, each optronic system being intended to emit and/or receive light from a target of the scene and each optronic system comprising an internal precision clock and a module suitable for synchronizing the internal clock with a reference time signal, the set of optronic systems being characterized in that it includes a receiver for a reference time signal transmitting this reference time signal to each internal clock of a synchronization module for the optronic systems, the reference time signal being independent of the optronic systems and emanating from an item of equipment different from the optronic systems, and in that it is adapted to implement a synchronization method according to the invention.

According to particular embodiments, the set of synchronized optronic systems include one or more of the following characteristic features in which each synchronization module includes a receiver for the reference time signal, and the receiver for the reference time signal is integrated within an external synchronization module that is different from each of the synchronization modules of the optronic systems.

BRIEF DESCRIPTION OF THE DRAWINGS

The invention will be better understood upon reading the description which follows, given by way of example, and with reference being made to the drawings, in which:

FIG. 5 is a block diagram illustrating another example of a set of synchronized optronic systems according to the invention.

DETAILED DESCRIPTION

The invention relates to a method of synchronizing multiple optronic systems operating simultaneously on one and the same scene and a set of optronic systems synchronized according to this method.

Figure 1:
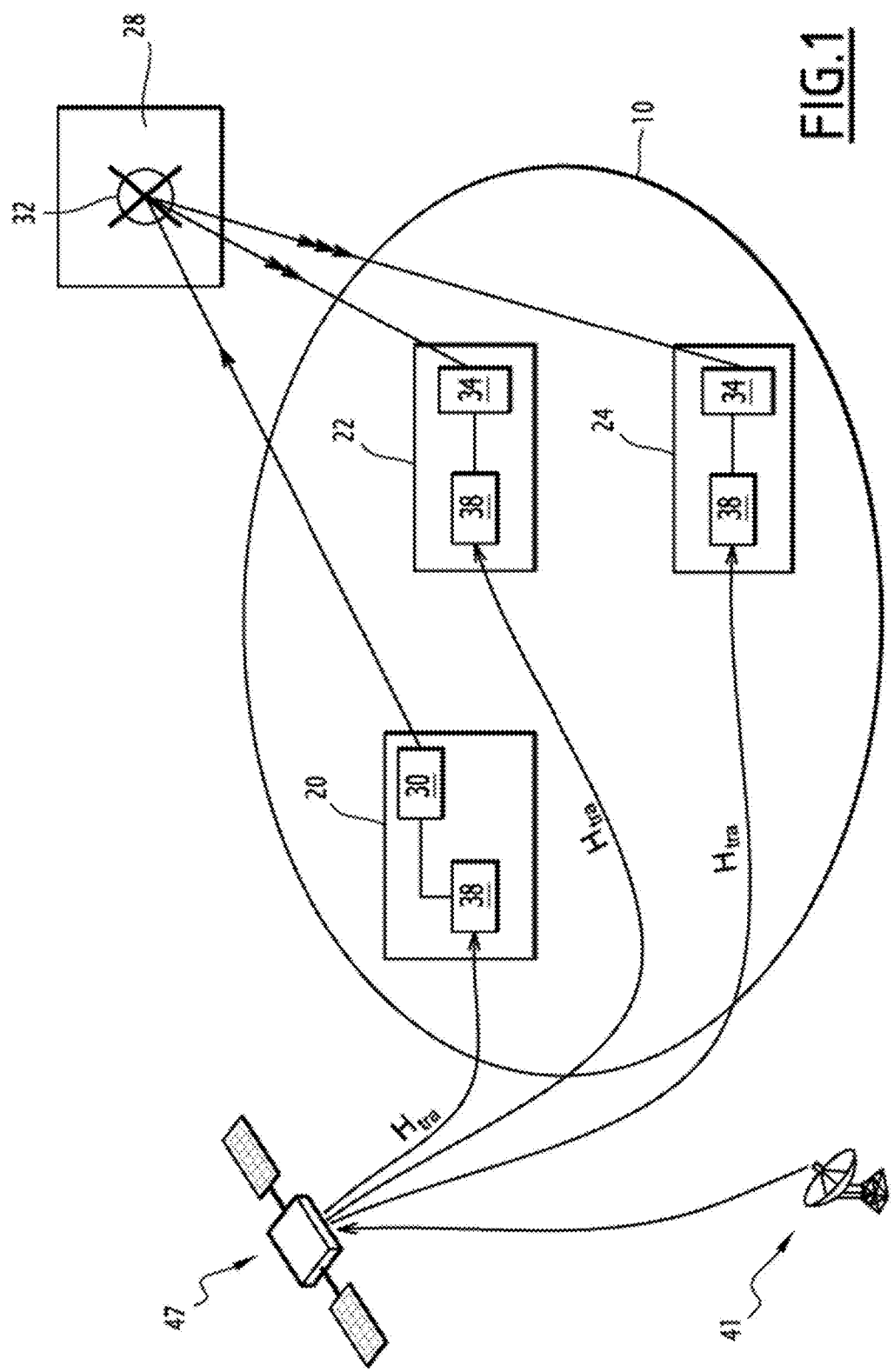
FIG. 1 is a block diagram illustrating an example of a set of synchronized optronic systems according to the invention.

FIG. 1 illustrates an example of a set 10 or fleet of optronic systems 20, 22, 24 operating on one and the same scene and intended to be synchronized together in accordance with the invention.

In a known manner, at least one optronic system 20 of the fleet 10 is capable of emitting a light pulse train in the direction of a target 28 of the scene in order to designate or identify it optically for the other optronic systems of the fleet 10, while at least one system 22, 24 of the optronic systems of the fleet 10 is capable of detecting at least the train of light pulses designating or identifying the target 28.

For this, the optronic system 20 includes the means for transmission 30 of trains of electromagnetic pulses, preferably of laser pulses, in the direction of the target in order to form a spot 32 of illumination on the target 28.

For example, the optronic system 20 is an infantryman equipped with a means of sight or with binoculars having or connected to such transmitting means 30.

In addition, the optronic systems 22, 24 capable of detecting this train of light pulses each comprise the means for detecting 34 the spot of illumination 32.

For example, the optronic systems 22 and 24 are aerial platforms (aircraft) or terrestrial platforms (armored) or even other soldiers, intended to support the infantryman in his mission, that include such means of detection 34. In addition, such platforms are for example equipped with laser-guided munitions, which from the detection of electromagnetic pulses are guided to the target 28 in order to neutralise it.

According to another example, the optronic system 20 is an aerial platform including laser designation means, that is to say means comprising of laser emitting means serving to illuminate a target for the purpose of guiding a weapon or facilitating the aiming of a light weapon. The optronic systems 22 and 24 are infantrymen validating the correct laser designation of the target in order to engage the reaction or are other aerial platforms equipped with devices that are guided by laser designation, such as a missile or a bomb.

Each optronic system 20, 22, 24 has a module 38 for generating a synchronization signal connected to the control means for the components integrated in the optronic systems 20, 22, 24. The module 38 for generating a synchronization signal is designed to transmit the synchronization signal generated to the control means of the components that are to be synchronized.

For example, the synchronization signal generated is used to control the means of transmission 30 and/or the means of detection 34 of the trains of electromagnetic pulses.

Figure 2:
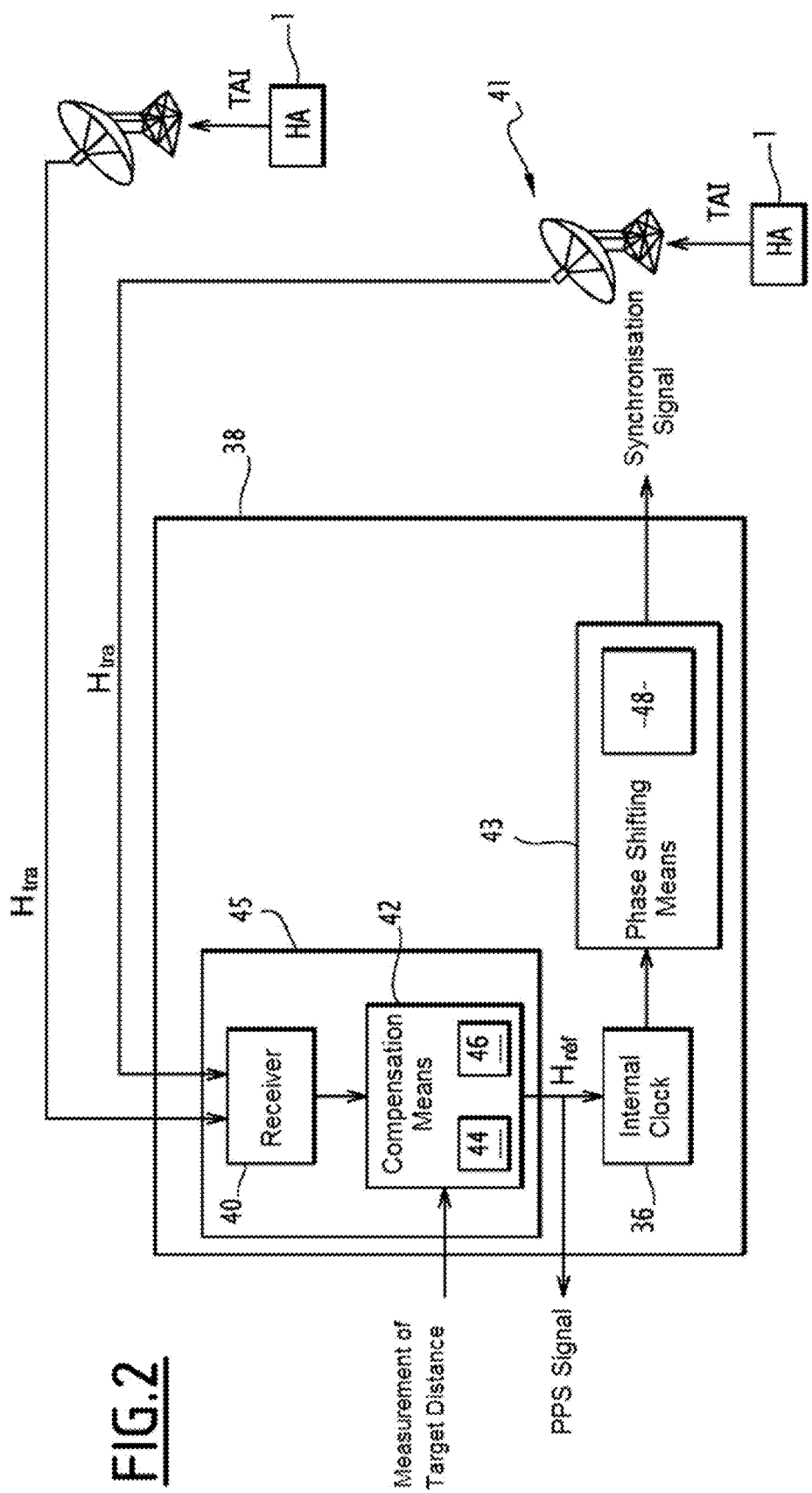
FIGS. 2 and 3 are detailed block diagrams of different examples of a synchronization module of one of the synchronized optronic systems in FIG. 1.

A module 38 for generating a synchronization signal for an optronic system 20, 22, 24 is detailed with regard to FIG. 2.

The module 38 includes an internal precision clock 36 and its own synchronization module 45 connected to the internal clock 36.

The synchronization module 45 is adapted to transmit to the internal clock a reference time signal, denoted $H_{ref}$, in order for the latter to be synchronized on it.

The internal clock is synchronized continuously or periodically over the reference time signal $H_{ref}$.

For example, the internal precision clock 36 is a quartz oscillator or some other high frequency oscillator such as a secondary atomic clock.

Furthermore, each synchronization module has a receiver 40 for at least one signal having a reference time code $H_{tra}$ transmitted by a network.

The module 45 is capable of outputting the reference signal $H_{ref}$ to the internal precision clock 36 from the signal having the reference time code $H_{tra}$.

Preferably, the reference time signal $H_{tra}$ is a signal representing the International Atomic Time (TAI) and Coordinated Universal Time (UTC) broadcast by a communication network.

The TAI is generated by a network of primary atomic clocks 1 on Earth, each connected to an antenna 41 of a terrestrial network adapted to transmit this TAI signal to the communication network.

The Coordinated Universal Time is a time scale standard system determined based on the TAI and from which it is offset by a integral number of seconds (determined on an annual or bi-annual basis) with a view to broadcasting a terrestrial time scale standard having a time difference of less than 0.9 s with the rotation of the Earth.

In a preferable manner, the communication network consists of 41 electromagnetic transmission antennas that exist in many countries such as the transmitter situated at Allouis for France or the DCF77 transmitter located near Frankfurt for Germany.

Moreover, the synchronization module 45 includes means of compensation 42 connected to the receiver 40 and adapted to generate the reference time signal $H_{ref}$ from the reference time signal $H_{tra}$.

The reference time signal $H_{ref}$ is calculated from the reference time signal transmitted $H_{tra}$ so as to take into account a variable time delay generated by the transmission time of this signal within the network.

The internal clock is capable of emitting a first synchronization signal, for example a TTL signal (for "Transistor-Transistor Logic") at the frequency or frequencies used by the optronic equipment.

In addition, the internal precision clock 36 is adapted to maintain with sufficient accuracy the time between two periods of refreshing the reference time signal $H_{ref}$ transmitted by the synchronization module 45.

For example, the stability of the internal precision clock is 1 ppm (for one part per million) which is 1 µs for 1s.

Each module for generating a synchronization signal 38 includes suitable means for phase shifting 43 of this first synchronization signal emitted by the internal clock of each optronic system 20, 22, 24.

The phase shifting means 43 are capable of introducing/adding a first phase shift $\phi_A$ to the internal clock signal emitted by the internal clock and synchronized to the TAI. The phase shifting means 43 are capable of generating a synchronization signal that is phase shifted relative to the synchronization signal emitted by the internal clock 36.

Moreover, the phase shifting means 43 include means for storing the first phase shift $\phi_A$.

Preferably, this first phase shift $\phi_A$ is predetermined (by the equipment manufacturer, the country or the user). For instance, this first phase shift $\phi_A$ is set at 48 µs for an entire fleet of optronic systems for a country, or for a client or even for an operation for example.

According to a variant, the phase shift means 43 comprise means for generation 48 of the first phase shift $\phi_A$ by a predetermined pseudo random code recorded or constructed by an algorithm in the storage and calculating means of the phase shift means 43.

Furthermore, each synchronization module 45 includes the means for compensation (offsetting) or adjustment 42 of the phase of the reference time signal based on the location of the optronic system in the scene or its relative position with respect to the target.

Such compensation means 42 are connected to the phase shifting means 43. In this exemplary embodiment, they are also connected to a GPS receiver integrated within an optronic system that transmits to them the spatial coordinates of the optronic system in the scene.

Such compensation means 42 includes the first means of compensating 44 for the phase shift $\phi_B$ induced by the propagation time of the reference time signal between the transmitter of the reference time signal and the optronic system operating on the scene. This phase shift $\phi_B$ thus depends on the spatial coordinates of the optronic system in the scene with respect to the spatial coordinates known to the transmitter used.

If all of the optronic systems of one same given scene are synchronized to one same given transmitter, and they are close to each other, and if their synchronization tolerance allows it, for example 300 m for a tolerance of 1 µs or for example 3 km for a tolerance of 10 µs it is not necessary to compensate for the phase shift $\phi_B$ of the reference signal $H_{tra}$ received by the receiver 40 by generating the reference signal $H_{ref}$ fed to the internal clock 36.

The compensation means 42 are capable of subtracting the second phase shift $\phi_B$ from the phase of the reference time signal received and processed by the receiver and synchronized to the TAI, so as to compensate for this second phase shift $\phi_B$ induced by the propagation time of the reference time signal.

The compensation means 44 includes means for calculating the second phase shift $\phi_B$ from the spatial coordinates of the optronic system in order to take into account the propagation delay time of the reference time signal from the transmitter 41 to the optronic system so that all the optronic systems in the same given fleet 10 are synchronized in phase.

In addition, the compensation means 42 has a second means for compensating 46 for a third phase shift $\phi_C$ induced by the propagation delay time of the electromagnetic pulses between the illuminated target and the optronic system operating on the scene.

This third phase shift $\phi_C$ thus depends on the relative distance of the optronic system to the target.

For this, the optronic system has the means for measuring the relative distance of the optronic system to the target that is adapted to transmit this distance to the second compensation means 46.

For example, the means for measuring the relative distance of the optronic system to the target are laser range finders.

The second compensation means 46 includes means for calculating the third phase shift $\phi_C$ from the relative distance of the optronic system to the target so as to take into account the time of propagation of the light between the illuminated target 28 and the optronic system so that all the optronic systems of the same given fleet aiming at the same given target 10 are synchronized to the target taking into account the time delay of propagation.

The phase shifting means 43 are adapted to subtract the third phase shift $\phi_C$ from the internal clock signal emitted by the internal clock and synchronized to the TAI, so as to compensate for this third phase shift $\phi_C$ induced by the propagation time of the light between the target and the optronic system.

Figure 3:
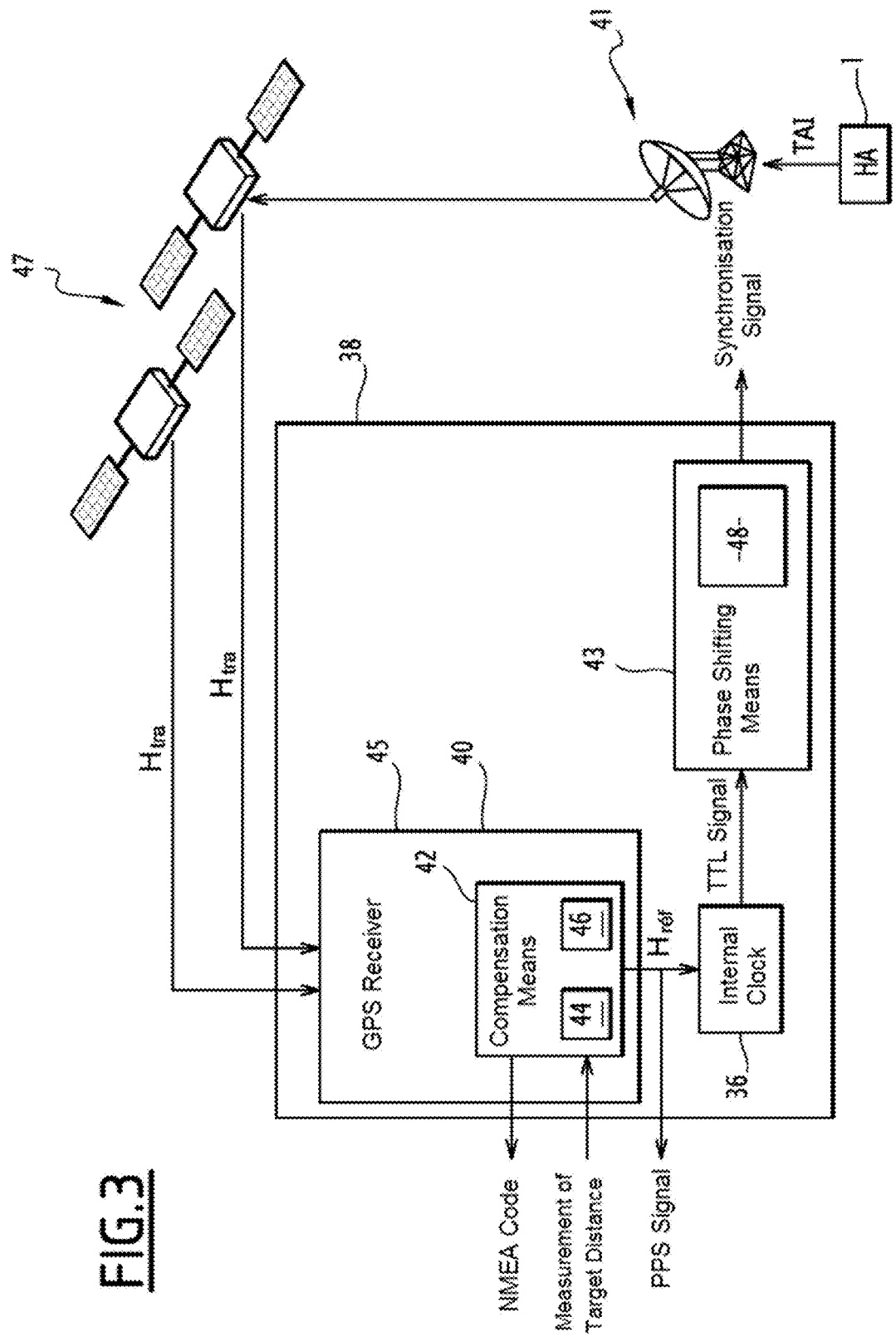

According to another example illustrated in FIG. 3, the communication network is a GPS (for "global positioning system") including the GPS satellites 47 adapted to receive the TAI signal. In a known manner, the GPS satellites 47 have a secondary atomic clock synchronized to the TAI.

Moreover, the GPS satellites 47 are each capable of generating the reference time signal $H_{tra}$ and transmitting it to the receiver 40 of the synchronization module 45. The reference time signal $H_{tra}$ is thus independent of the optronic systems and is emanated from an equipment system that is different from the optronic systems.

Preferably, the receiver 40 of the reference time signal is a GPS receiver for receiving the reference time signals transmitted by several satellites, representative of the International Atomic Time (TAI) and adapted, in a known manner, to generate and transmit a signal of one pulse per second (PPS "pulse per second") set precisely to the TAI with an accuracy class up to the microsecond for commercial grade consumer receivers.

According to a variant, the accuracy is of the order of nanoseconds.

The stability of the internal precision clock is said to be 1 ppm with an accuracy of 1 μs and PPS signal provided refresh capability.

At the same time, it is known that the GPS receiver is adapted to generate and transmit a serial signal, called NMEA code—for "National Marine Electronics Association", emitting a certain number of data items among which are included the date and absolute UTC time for the current second. It is known that this code or standard is a specification for communication between marine equipment and systems including among which are GPS equipment and devices. The NMEA code enables absolute timing of the PPS signal on each receiver.

Moreover, the GPS receiver 40 includes the compensation means 44, 46 adapted for generating the reference time signal $H_{ref}$ from the reference time signal $H_{tra}$ emitted by several satellites. These means 44, 46 have already been described previously.

Figure 4:
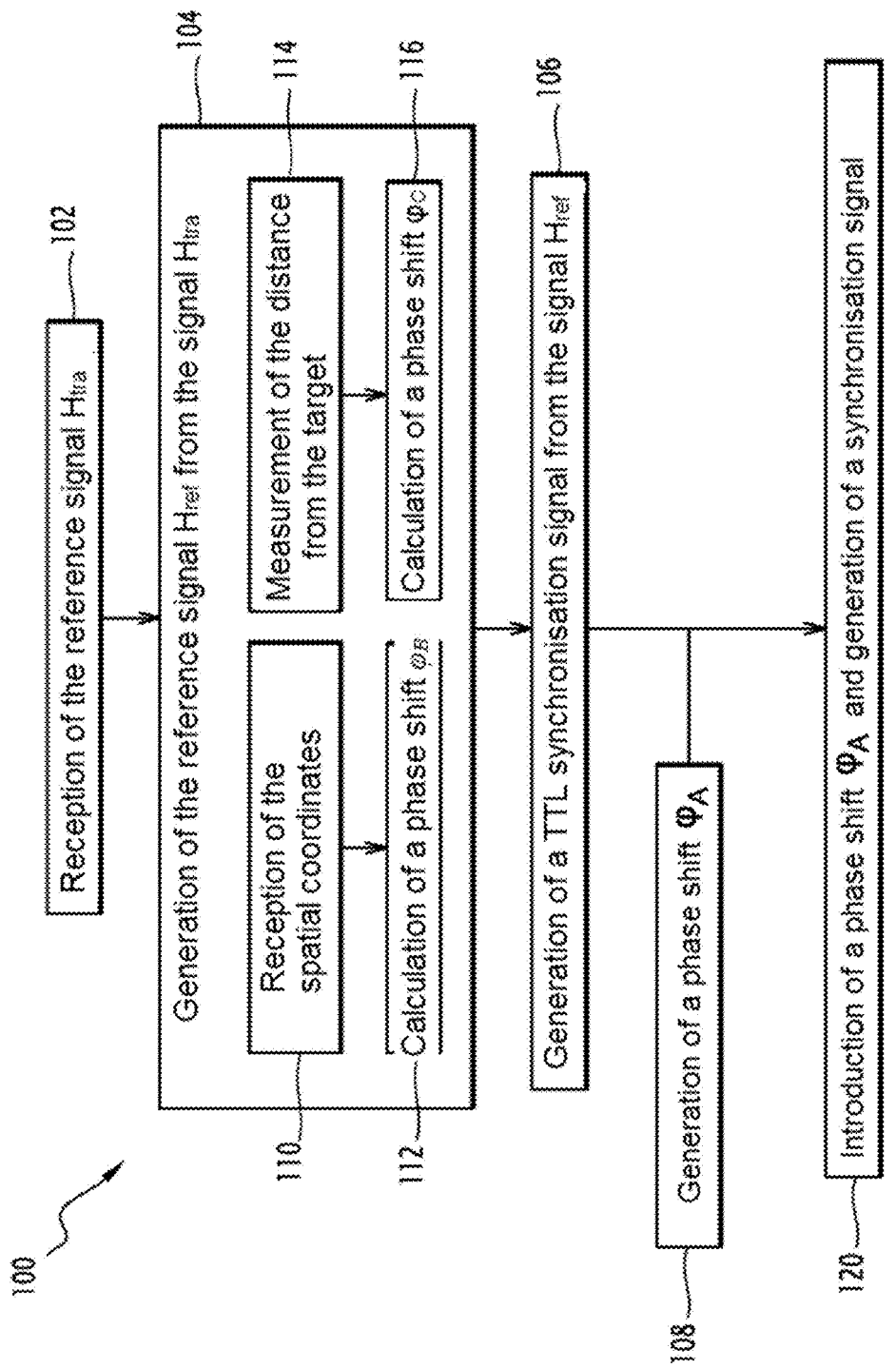
FIG. 4 is a block diagram illustrating a method of synchronization implemented by the set of synchronized optronic systems in FIG. 1.

Each module 38 for generating a synchronization signal for an optronic system 20, 22, 24 of a fleet of equipment 26 implements a synchronization method 100 according to the invention which will now be described with reference to FIG. 4. However, it will be described for only one optronic system and therefore for only one synchronization module.

The synchronization method 100 begins with step 102 of receiving the time signal transmitted $H_{tra}$ by the receiver 40 of the synchronization module 38.

During the course of a step 104, the synchronization module 45 generates a signal with a reference time code $H_{ref}$ from the signal with the reference time code $H_{tra}$ and transmits it to the internal precision clock 36 of the module 38 for generating a synchronization signal.

In order to generate this reference signal $H_{ref}$, the receiver 40 transmits the reference time signal $H_{tra}$, to the compensation means 42, so as to take into account a possible variable delay caused by the transmission time of this signal within the network.

This step 104 includes a sub step 110 of receiving the spatial coordinates of the optronic system by the GPS receiver, for example, and of transmission thereof to the first compensation means 44 for the second phase shift $\phi_B$ induced by the propagation time of the reference time signal between the transmitter of the reference time signal and the optronic system.

This sub step 110 is followed by a step 112 of calculating this second phase shift $\phi_B$ from the spatial coordinates of the optronic system so as to take into account the propagation time of the reference time signal to the optronic system. This calculation 112 is performed, if necessary, on a continuous basis in order to update this second phase shift, as a function of the displacement of the optronic system in the scene.

In parallel, a sub step 114 for measuring the relative distance of the optronic system to the target is performed by the means for measuring the distance of the optronic system, such as a laser rangefinder.

The measuring means transmit this calculated distance to the calculating means of the second compensation means 46 in order for them to calculate, during a sub step 116, a third phase shift $\phi_C$ induced by the propagation time of the electromagnetic pulses between the illuminated target and the optronic system and operating on the scene.

This third phase shift $\phi_C$ is thus calculated from the relative distance of the optronic system to the target so as to take into account this propagation time of the light between the illuminated target 28 and the optronic system.

This calculation 116 is performed, if necessary, on a continuous basis in order to update the third phase shift, as a function of the displacement of the optronic system or target in the scene.

The reference signal $H_{ref}$ is generated from the reference signal $H_{tra}$ and from the second and third phase shifts calculated.

In the case of a transmitter such as DCF77 (located near Frankfurt) or the transmitter in Allouis (located in the administrative department of Cher in France), the knowledge of the distance from the transmitter makes it possible to estimate the propagation time and thus the delay in receiving the signal $H_{tra}$.

In the case of a GPS receiver, if a sufficient number of GPS satellites 47, preferably greater than 3, are detected, the receiver 40 receives coded time signals from each of the satellites. The latter have a known orbit in an x, y, z orbital reference framework brought about by the centre of gravity of the Earth. The analysis of the relative delays of the time signals received by the GPS receiver 40, makes it possible to constrain its x, y, z position in the reference coordinate system. It is known that with at least the reception of signals from four satellites, it is possible thus to determine the absolute position of the receiver with an accuracy of within a few meters. By knowing its relative position with respect to the satellites, the transmission delay of the respective signals from each satellite is determined.

According to a variant, if the receiver 40 is a GPS receiver, it also generates a PPS signal set with a very good accuracy to the TAI or the UTC. This step is known to the person skilled in the art and therefore will not be detailed here. This principle in its entirety is applicable to all other satellite positioning systems based on GNSS (for "Global Navigation Satellite System"), the best known example of which is the GPS, but there is at least another one of these systems, which is the Russian Glonass and in the future the Galileo system.

The method is continued with a step 106 of generating a synchronization signal such as the TTL (transistor—transistor logic) type signal, by the internal clock of the oscillator type that is stable at high frequencies (a quartz crystal based oscillator, an atomic clock, for example), from the reference time signal $H_{ref}$.

This synchronization signal is constructed from the frequency sampling from the harmonics of useful frequencies of the elements of the optronic system to be controlled. For example, a video camera requires a synchronization signal having a frequency of 25 Hz or 50 Hz.

This signal is then emitted to the phase shifting means 43 of the module 38 for generating a synchronization signal in order for them to add to it a first phase shift $\phi_A$ that is predetermined in a step 108.

This phase shift $\phi_A$ has been previously stored in the storage means of the phase shifting means 43 prior to a mission involving optronic the systems operating on the scene.

According to a variant, the first phase shift $\phi_A$ is generated by the generating means 48 of the phase shift means 43 through a predetermined pseudo random code recorded in the storage means, or calculated by an algorithm from the generating means 48.

After calculation, the first phase shift $\phi_A$ is recorded in these storage means.

Thus the module 38 allows for generating a synchronization signal set to the International Atomic Time (TAI), which subsequently is used to control the means for transmission 30 and/or the means for detection 34 of electromagnetic pulse trains.

For example, a camera receives a control signal synchronized on the signal generated by the module 38 in order for it to operate at a frequency or rate of acquisition of 50 frames per second, or indeed a laser in order for it to emit 10 pulses per second.

According to a further example of the invention illustrated in FIG. 5, the set of optronic systems is synchronized by an external synchronization module 50. This module is called external because it is not integrated within the optronic systems to be operated in a synchronous manner in the scene.

Each optronic system 20, 22, 24 includes an internal precision clock 36 and a synchronization module 38 for the internal clock 36 with a reference time signal, which is identical to those described above.

The external synchronization module 50 includes a receiver 52 for a reference time signal $H_{ref}$ connected to a transmitter 54 built in to the external synchronization module 50. This transmitter 54 is adapted to transmit this reference time signal $H_{ref}$ to each synchronization signal generating module 38 of the optronic systems, in particular to the receiver 40 of the synchronization module.

This receiver 52 of a reference time signal $H_{ref}$ is identical to those previously described in the synchronization modules 38 of the optronic systems and will not be detailed here.

An advantage of the synchronization method according to the invention is that all the optronic systems in a same given fleet intended to operate simultaneously in a collaborative fashion with each other are thus well synchronized without having to strive for the synchronization.

This is particularly the case for optronic systems performing missions of a collaborative nature, for example laser guidance systems and munitions guided by these systems.

In Indeed, in the course of this type of application that relates to the detection of pulsed laser spot to guide the munitions, the method according to the invention allows for significantly reducing the time for integration of the camera of the laser guidance system used for detection of the laser spot and thereby for increasing its performance and in addition, with the capacity to operate right from the first laser pulse emitted and observed.

Moreover, two fleets of optronic systems having different phase shifts $\phi_A$ are not compatible with each other or may operate under conditions or performance levels that are highly degraded compared to devices and equipment from the same given fleet that are synchronized.

The invention is not limited to the exemplary embodiments described and shown, in particular, it can be extended to all types of optronic systems for example: cameras seeking to view a laser designation spot, laser jammers without collateral effect, stereoscopic 3D observation means, and multi-camera mobile units for stage, semi-active imaging systems.

The invention claimed is:

1. A method of synchronizing a plurality of optronic systems operating simultaneously on a same scene, each optronic system being intended to emit and/or to receive light from a target on the scene, each optronic system comprising an accurate internal clock and a synchronization module synchronizing the accurate internal clock with a reference time signal, wherein the method comprises the following steps:
   receiving a first reference time signal by each synchronization module, the first reference time signal being independent of the optronic systems and emanating from equipment different from the optronic systems,
   generating a second reference time signal by each synchronization module, and
   synchronizing, by each synchronization module, each accurate internal clock with the second reference time signal.

2. The synchronization method according to claim 1, further comprising the step of adding a same phase shift to the internal time signal of each optronic system belonging to a same fleet, the optronic systems being synchronized in phase.

3. The synchronization method according to claim 2, wherein the phase shift is generated in a pseudo random manner.

4. The synchronization method according claim 1, wherein the reference time signal is a signal that is representative of at least one of the International Atomic Time or the Coordinated Universal Time broadcast by a communication network.

5. The synchronization method according to claim 4, wherein the communication network is a global positioning system or a microwave radio system network.

6. The synchronization method according to claim 1, wherein the method comprises, for each optronic system, a step of compensating for a phase shift induced by the propagation time of light between the illuminated target and the optronic system operating on the scene.

7. The synchronization method according to claim 1, wherein the method comprises, for each optronic system, a step of compensating for a phase shift induced by the propagation time of the reference time signal between the transmitter of the reference time signal and the optronic system operating on the scene.

8. A set of optronic systems operating simultaneously and synchronously on a same scene, each optronic system being intended to emit and/or receive light from a target of the scene and each optronic system comprising:
   an accurate internal clock,
   a synchronization module synchronizing the accurate internal clock with a reference time signal,
   a receiver receiving a reference time signal and transmitting this reference time signal to each accurate internal clock of the optronic systems,
   wherein the reference time signal is independent of the optronic systems and emanates from an item of equipment different from the optronic systems, the set of optronic systems being configured to implement a synchronization method comprising:
   reception of a first reference time signal by each synchronization module, the first reference time signal being independent of the optronic systems and emanating from an equipment different from the optronic systems;
   generation of a second reference time signal by each synchronization module; and
   synchronization, by each synchronization module, of each accurate internal clock with the second reference time signal.

9. The set of optronic systems according to claim 8, wherein each synchronization module comprises the receiver of the first reference time signal.

10. The set of optronic systems according to claim 8, wherein the receiver of the reference time signal is integrated within an external synchronization module, the external synchronization module being different from each of the synchronization modules of the optronic systems.

* * * * *